United States Patent
Ashbolt et al.

(10) Patent No.: US 11,817,591 B2
(45) Date of Patent: Nov. 14, 2023

(54) SEAL ASSEMBLY FOR A BATTERY CELL

(71) Applicant: DURACELL U.S. OPERATIONS, INC., Wilmington, DE (US)

(72) Inventors: Mark T. Ashbolt, Newtown, CT (US); Daniel G. Allen, New Milford, CT (US); Oleg Podoprigora, New Milford, CT (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 277 days.

(21) Appl. No.: 17/327,091

(22) Filed: May 21, 2021

(65) Prior Publication Data

US 2021/0367297 A1 Nov. 25, 2021

Related U.S. Application Data (60) Provisional application No. 63/029,273, filed on May 22, 2020.

(51) Int. Cl.
*H01M 50/184* (2021.01)
*H01M 50/148* (2021.01)
(Continued)

(52) U.S. Cl.
CPC ....... *H01M 50/184* (2021.01); *H01M 50/147* (2021.01); *H01M 50/193* (2021.01);
(Continued)

(58) Field of Classification Search
CPC ............. H01M 50/184; H01M 50/147; H01M 50/186; H01M 50/171; H01M 50/154
See application file for complete search history.

(56) References Cited

U.S. PATENT DOCUMENTS

| 4,122,242 A | 10/1978 | Feldhake |
| 4,869,978 A | 9/1989 | Kubo et al. |

(Continued)

FOREIGN PATENT DOCUMENTS

| CN | 103247806 A | 8/2013 |
| CN | 104844755 A | 8/2015 |

(Continued)

OTHER PUBLICATIONS

EPO machine generated English translation of JP-2017117670-A (Year: 2017).*

(Continued)

*Primary Examiner* — Christopher P Domone
*Assistant Examiner* — Kimberly Wyluda
(74) *Attorney, Agent, or Firm* — MARSHALL, GERSTEIN & BORUN LLP (57) ABSTRACT

A seal assembly for a battery cell includes a grommet having an opening having an inner surface. A nail has a nail head and a stem extending from the stem. The stem includes a first portion with a larger diameter and a second portion with a smaller diameter and the stem extends through the opening in the grommet. The stem and the grommet form a first interference fit at a distal end of the opening. A trap clearance is formed between the distal end of the opening and the nail head. The trap clearance defines a trap for a sealant. A sealant is disposed on the stem and is located at least partially in the trap.

20 Claims, 6 Drawing Sheets

(51) Int. Cl.
*H01M 50/171* (2021.01)
*H01M 50/186* (2021.01)
*H01M 50/193* (2021.01)
*H01M 50/147* (2021.01)

(52) U.S. Cl.
CPC ........ *H01M 50/154* (2021.01); *H01M 50/171* (2021.01); *H01M 50/186* (2021.01)

(56) References Cited

U.S. PATENT DOCUMENTS

| | | | |
|---|---|---|---|
| 4,942,101 A | 7/1990 | Audebert et al. | |
| 4,966,822 A | 10/1990 | Johnston | |
| 5,080,985 A | 1/1992 | Wiacek et al. | |
| 5,332,633 A | 7/1994 | Adamson et al. | |
| 5,376,480 A | 12/1994 | Shinoda et al. | |
| 5,445,908 A | 8/1995 | Inoue et al. | |
| 5,447,809 A | 9/1995 | Hafner et al. | |
| 5,587,254 A | 12/1996 | Kojima et al. | |
| 6,025,090 A | 2/2000 | Sargeant et al. | |
| 6,042,967 A | 3/2000 | Sargeant et al. | |
| 6,083,642 A | 7/2000 | Kato et al. | |
| 6,265,105 B1 | 7/2001 | Tokuda et al. | |
| 6,410,189 B1 | 6/2002 | Yamada et al. | |
| 6,482,543 B1 | 11/2002 | Shelekhin et al. | |
| 6,495,284 B2 | 12/2002 | Sargeant et al. | |
| 6,566,009 B1 | 5/2003 | Noya et al. | |
| 6,586,139 B1 | 7/2003 | Watanabe et al. | |
| 6,649,303 B2 | 11/2003 | Kasuga et al. | |
| 6,720,108 B2 | 4/2004 | Yamamoto et al. | |
| 6,723,469 B1 | 4/2004 | Watanabe et al. | |
| 6,958,200 B2 | 10/2005 | Kato et al. | |
| 7,144,656 B2 | 12/2006 | Tsutsui et al. | |
| 7,169,507 B2 | 1/2007 | Inokuchi et al. | |
| 7,491,464 B2 | 2/2009 | Merrill et al. | |
| 7,514,174 B2 | 4/2009 | Nanno et al. | |
| 7,517,611 B2 | 4/2009 | Matsuhisa et al. | |
| 7,527,898 B2 | 5/2009 | Noya et al. | |
| 7,691,531 B2 | 4/2010 | Kato et al. | |
| 7,745,038 B2 | 6/2010 | Yoshioka et al. | |
| 7,754,387 B2 | 7/2010 | Harada et al. | |
| 7,875,390 B2 | 1/2011 | Takamura et al. | |
| 7,897,282 B2 | 3/2011 | Bito et al. | |
| 7,910,238 B2 | 3/2011 | Kato et al. | |
| 8,080,336 B2 | 12/2011 | Izumi et al. | |
| 8,241,785 B2 | 8/2012 | Fujiwara et al. | |
| 8,247,108 B2 | 8/2012 | Fujiwara et al. | |
| 8,247,111 B2 | 8/2012 | Mushiga | |
| 8,283,068 B2 | 10/2012 | Sumihiro et al. | |
| 8,361,650 B2 | 1/2013 | Nakamura et al. | |
| 8,460,827 B2 | 6/2013 | Iwama et al. | |
| 8,709,646 B2 | 4/2014 | Nunome et al. | |
| 8,795,880 B2 | 8/2014 | Matsubara | |
| 8,802,286 B2 | 8/2014 | Konishiike et al. | |
| 8,859,139 B2 | 10/2014 | Asahina et al. | |
| 8,940,430 B2 | 1/2015 | Phillips et al. | |
| 9,040,196 B2 | 5/2015 | Kato et al. | |
| 9,299,972 B2 | 3/2016 | Kim et al. | |
| 9,627,657 B2 | 4/2017 | Sumiyama et al. | |
| 9,742,031 B2 | 8/2017 | Lv et al. | |
| 9,742,039 B2 | 8/2017 | Kawase et al. | |
| 10,446,804 B2 | 10/2019 | Ono et al. | |
| 10,461,294 B2 | 10/2019 | Hayakawa et al. | |
| 2002/0090549 A1 | 7/2002 | Urade et al. | |
| 2003/0118892 A1 | 6/2003 | Ray et al. | |
| 2005/0031951 A1 | 2/2005 | Mushiga et al. | |
| 2005/0064284 A1 | 3/2005 | Sumiyama et al. | |
| 2005/0271942 A1 | 12/2005 | Izumi et al. | |
| 2006/0222941 A1 | 10/2006 | Yamashita et al. | |
| 2007/0148551 A1 | 6/2007 | Murakami et al. | |
| 2007/0184344 A1 | 8/2007 | Mukai et al. | |
| 2008/0044730 A1 | 2/2008 | Matsuhisa et al. | |
| 2008/0254364 A1 | 10/2008 | Sumihiro et al. | |
| 2008/0280209 A1 | 11/2008 | Kato et al. | |
| 2009/0035650 A1 | 2/2009 | Fujiwara et al. | |
| 2009/0098462 A1 | 4/2009 | Fujiwara et al. | |
| 2009/0123824 A1 | 5/2009 | Fujiwara et al. | |
| 2009/0169988 A1 | 7/2009 | Kato et al. | |
| 2009/0181299 A1 | 7/2009 | Kato et al. | |
| 2009/0197165 A1 | 8/2009 | Wada et al. | |
| 2009/0220861 A1 | 9/2009 | Yamaguchi | |
| 2009/0263710 A1 | 10/2009 | Kato et al. | |
| 2009/0269660 A1 | 10/2009 | Shimamura et al. | |
| 2011/0081579 A1 | 4/2011 | Kato | |
| 2011/0123847 A1 | 5/2011 | Kato et al. | |
| 2011/0189517 A1 | 8/2011 | Kato et al. | |
| 2012/0009465 A1 | 1/2012 | Kato et al. | |
| 2012/0208051 A1 | 8/2012 | Tsukiji et al. | |
| 2013/0065096 A1 | 3/2013 | Daniel-Ivad | |
| 2013/0065112 A1 | 3/2013 | Uzuka et al. | |
| 2014/0205909 A1 | 7/2014 | Yonehara et al. | |
| 2014/0287298 A1 | 9/2014 | Sumihiro | |
| 2018/0026271 A1 | 1/2018 | Oh et al. | |
| 2019/0296278 A1 | 9/2019 | Yamazaki et al. | |
| 2020/0091471 A1 | 3/2020 | Miyata et al. | |
| 2020/0099058 A1 | 3/2020 | Moon et al. | |

FOREIGN PATENT DOCUMENTS

| | | |
|---|---|---|
| CN | 105633324 A | 6/2016 |
| CN | 205921035 U | 2/2017 |
| EP | 0081201 A2 | 6/1983 |
| EP | 0504160 B1 | 2/1996 |
| GB | 2139807 A | 11/1984 |
| JP | S5873952 A | 5/1983 |
| JP | S58106756 A | 6/1983 |
| JP | S58161241 A | 9/1983 |
| JP | S59148268 A | 8/1984 |
| JP | H06013062 A | 1/1994 |
| JP | H06290766 A | 10/1994 |
| JP | H06325768 A | 11/1994 |
| JP | H07045261 A | 2/1995 |
| JP | H07326335 A | 12/1995 |
| JP | H08124544 A | 5/1996 |
| JP | H09129204 A | 5/1997 |
| JP | 2001052688 A | 2/2001 |
| JP | 2001283870 A | 10/2001 |
| JP | 2001-313042 A | 11/2001 |
| JP | 3235143 B2 | 12/2001 |
| JP | 3512826 B2 | 3/2004 |
| JP | 3522303 B2 | 4/2004 |
| JP | 2005056733 A | 3/2005 |
| JP | 2005100805 A | 4/2005 |
| JP | 2005116381 A | 4/2005 |
| JP | 2006004900 A | 1/2006 |
| JP | 3814480 B2 | 8/2006 |
| JP | 2006202637 A | 8/2006 |
| JP | 2006228719 A | 8/2006 |
| JP | 2006313678 A | 11/2006 |
| JP | 3866902 B2 | 1/2007 |
| JP | 2007026924 A | 2/2007 |
| JP | 2007220380 A | 8/2007 |
| JP | 4028700 B2 | 12/2007 |
| JP | 2008004428 A | 1/2008 |
| JP | 2008047496 A | 2/2008 |
| JP | 2009043417 A | 2/2009 |
| JP | 4251488 B2 | 4/2009 |
| JP | 2009087882 A | 4/2009 |
| JP | 4300082 B2 | 7/2009 |
| JP | 2009164079 A | 7/2009 |
| JP | 2009-176631 A | 8/2009 |
| JP | 4324396 B2 | 9/2009 |
| JP | 2010010097 A | 1/2010 |
| JP | 2010080184 A | 4/2010 |
| JP | 4562984 B2 | 10/2010 |
| JP | 4613477-62 | 1/2011 |
| JP | 4729321-62 | 7/2011 |
| JP | 2011-216217 A | 10/2011 |
| JP | 2011216218 A | 10/2011 |
| JP | 2011-243367 A | 12/2011 |
| JP | 4861625-62 | 1/2012 |
| JP | 2012028240 A | 2/2012 |
| JP | 4909525 B2 | 4/2012 |
| JP | 5070812 B2 | 11/2012 |

(56) References Cited

FOREIGN PATENT DOCUMENTS

| | | | |
|---|---|---|---|
| JP | 5095243 | B2 | 12/2012 |
| JP | 5097357 | B2 | 12/2012 |
| JP | 5258340 | B2 | 8/2013 |
| JP | 2014007002 | A | 1/2014 |
| JP | 5419256 | B2 | 2/2014 |
| JP | 5514632 | B2 | 6/2014 |
| JP | 5631790 | B2 | 11/2014 |
| JP | 5779453 | B2 | 9/2015 |
| JP | 5802489 | B2 | 10/2015 |
| JP | 5836178 | B2 | 12/2015 |
| JP | 6118564 | B2 | 4/2017 |
| JP | 2017117670 | A * | 6/2017 |
| JP | 6259670 | B2 | 1/2018 |
| JP | 6322430 | B2 | 5/2018 |
| JP | 6663633 | B2 | 3/2020 |
| WO | WO-03/063268 | A1 | 7/2003 |
| WO | WO-2006/004033 | A1 | 1/2006 |
| WO | WO-2008/029762 | A1 | 3/2008 |
| WO | WO-2010/058901 | A2 | 5/2010 |
| WO | WO-2010/140295 | A1 | 12/2010 |
| WO | WO-2011/080854 | A1 | 7/2011 |
| WO | WO-2014/030596 | A1 | 2/2014 |
| WO | WO-2018/123123 | A1 | 7/2018 |
| WO | WO-2018/184566 | A1 | 10/2018 |

OTHER PUBLICATIONS

EPO machine generated English translation of JP 2001-313042 A, (Year: 2001).*
EPO machine generated English translation of JP 2011-216217 A (Year: 2011).*
International Application No. PCT/US2021/033637, International Search Report and Written Opinion, dated Aug. 12, 2021.

* cited by examiner

SEAL ASSEMBLY FOR A BATTERY CELL

FIELD OF THE DISCLOSURE

The disclosure relates to seal assemblies for battery cells and more specifically to seal assemblies that are configured to reduce leakage of an electrolyte from inside the battery cell.

BACKGROUND

Consumer electronic devices have certain power requirements. Generally, consumer electronic devices receive power from a single battery cell (contained within the device itself), or from a portable battery pack that may include one or more battery cells. Alternatively, one or more single use or rechargeable consumer battery cells may be used and replaced in a device as needed. Replaceable and rechargeable consumer battery cells generate electricity through reduction of a cathode and oxidation of an anode. An alkaline electrolyte is often used to facilitate movement of ions from the anode to the cathode.

Alkaline battery cells (including rechargeable alkaline battery cells) are known to be susceptible to the leakage of alkaline electrolytes from a battery seal. See, for example, Hull et al., "Why Alkaline Cells Leak," *J. Electrochem. Soc.*, 124(3):332-339, (1977) and Davis et al., "Aspects of Alkaline Cell Leakage," *J. Electrochem. Soc.*, 125(12):1918-123 (1978). Evidence of alkaline electrolyte leakage can be visibly detected because a white powder is deposited around a battery cell seal. Alkaline electrolyte leakage may be attributable to alkaline electrolyte creepage along negatively polarized electrodes. Alkaline electrolyte leakage may be exacerbated by physical factors such as scratches or other physical deformations/imperfections in a seal of a battery cell. Although the powdered alkaline electrolyte is generally safe for human contact, contact should be minimized because respiratory, eye, and skin irritation may occur. Moreover, loss of electrolyte can lead to decline of battery cell performance.

SUMMARY OF THE DISCLOSURE

According to one embodiment, a seal assembly for a battery cell includes a grommet having an opening with an inner surface, the opening having a proximal end and a distal end. A nail has a nail head and a stem extending from the nail head. The stem includes a first portion with a larger first stem diameter and a second portion with a smaller second stem diameter and the stem extends through the opening in the grommet. The stem and the grommet form a first interference fit at the distal end of the opening. A trap clearance is formed between the distal end of the opening and the proximal end of the opening. The trap clearance being radially and longitudinally located between the second portion of the nail and the inner surface, and the trap clearance defining a trap for a sealant. A sealant is disposed on the stem and is located at least partially in the trap.

According to another embodiment, a battery cell includes a housing. The housing has a first cover at a first housing end and a second cover at a second housing end. An anode and a cathode are disposed within the housing. A seal assembly is located proximate to the first cover. The seal assembly includes a grommet having an opening and an inner surface. A nail has a nail head and a stem extending from the nail head. The stem includes a first portion with a larger first diameter and a second portion with a smaller second diameter and the stem extends through the opening in the grommet. The stem and the grommet form a first interference fit at a distal end of the opening. A trap clearance is formed between the distal end of the opening and the nail head. The trap clearance being radially and longitudinally located between the second portion of the nail and the inner surface, and the trap clearance defining a trap for a sealant. A sealant is disposed on the stem and the sealant is located at least partially in the trap.

According to another embodiment, a seal assembly for a battery cell includes a grommet having an opening including a distal end, a proximal end, and a bore having an inner surface between the distal end and the proximal end. An internal annular ring is positioned proximate the distal end, the internal annular ring having a ring diameter. The bore has a bore diameter. A headspace is located at the proximal end and the headspace has a headspace diameter. The ring diameter is smaller than the bore diameter and the headspace diameter, and the bore diameter is smaller than the headspace diameter. A nail has a nail head and a stem extending from the nail head. The stem includes a first portion with a first stem diameter and a second portion with a second stem diameter. The first stem diameter is larger than the second stem diameter. The stem extends through the opening in the grommet. The stem and the grommet form a first interference fit between the second portion of the stem and the ring diameter. The stem and the grommet form a trap clearance between the second portion of the stem and the bore diameter, the trap clearance defining a trap for a sealant. A sealant is disposed on the stem and at least partially located in the trap.

According to another embodiment, a battery cell includes a housing having a first cover at a first housing end and a second cover at a second housing end, and an anode and a cathode disposed within the housing. A seal assembly is located proximate the first cover. The seal assembly includes a grommet having an opening including a distal end, a proximal end, and a bore having an inner surface between the distal end and the proximal end. An internal annular ring is positioned proximate the distal end, the internal annular ring having a ring diameter. The bore has a bore diameter. A headspace is located at the proximal end and the headspace has a headspace diameter. The ring diameter is smaller than the bore diameter and the headspace diameter, and the bore diameter is smaller than the headspace diameter. A nail has a nail head and a stem extending from the nail head. The stem includes a first portion with a first stem diameter and a second portion with a second stem diameter. The first stem diameter is larger than the second stem diameter. The stem extends through the opening in the grommet. The stem and the grommet form a first interference fit between the second portion of the stem and the ring diameter. The stem and the grommet form a trap clearance between the second portion of the stem and the bore diameter, the trap clearance defining a trap for a sealant. A sealant is disposed on the stem and at least partially located in the trap.

The foregoing embodiments of a seal assembly or a battery cell may further include any one or more of the following optional features, structures, and/or forms.

In some optional forms, the second portion is distal to the first portion relative to the head.

In other optional forms, the first portion and the second portion are joined by a chamfer.

In other optional forms, the inner surface of the opening includes the bore having the bore diameter, the bore diameter being larger than the second stem diameter and smaller than the first stem diameter, at least some of the second stem diameter is located within the bore diameter, such that no interference fit is present between the second stem diameter and the bore diameter when the nail is assembled in the grommet.

In other optional forms, the trap is formed, in an assembled battery cell, between the bore and the second portion of the stem, the bore diameter being larger than the second stem diameter.

In other optional forms, the bore diameter is between 0.03 mm and 0.05 mm larger than the second stem diameter.

In other optional forms, the grommet opening includes an internal annular ring.

In other optional forms, the internal annular ring has a ring diameter that is smaller than the bore, and the internal annular ring forms the first interference fit with the second portion of the stem.

In other optional forms, the trap is located above the internal annular ring, along a length of the stem.

In other optional forms, the trap has a volume of between 0.35 mm$^3$ and 1.5 mm$^3$.

In other optional forms, the stem includes an annular recess.

In other optional forms, the trap clearance is formed by the annular recess.

In other optional forms, the stem includes a plurality of annular recesses.

In other optional forms, the grommet comprises a polymer, such as polypropylene or nylon.

In other optional forms, the nail comprises a metal, such as brass or bronze.

In other optional forms, the sealant comprises a polymer such as polyamide or a petroleum-based material, such as an asphalt based material.

In other optional forms, a head clearance is formed between the nail head and the grommet and sealant is also disposed in the head clearance.

BRIEF DESCRIPTION OF THE DRAWINGS

While the specification concludes with claims particularly pointing out and distinctly claiming the subject matter, which is regarded as forming the present invention, the invention will be better understood from the following description taken in conjunction with the accompanying drawings.

DETAILED DESCRIPTION

Electrochemical cells, or batteries, may be primary or secondary. Primary batteries are meant to be discharged, e.g., to exhaustion, only once and then discarded. Primary batteries (or disposable batteries) are described, for example, in David Linden, Handbook of Batteries (4$^{th}$ ed. 2011), which is hereby incorporated by reference. Secondary batteries (or rechargeable batteries) are intended to be recharged and used over and over again. Secondary batteries may be discharged and recharged many times, e.g., more than fifty times, a hundred times, or more. Secondary batteries are described, for example, in David Linden, Handbook of Batteries (4$^{th}$ ed. 2011), which again is hereby incorporated by reference. Accordingly, batteries may include various electrochemical couples and electrolyte combinations. The description and examples provided herein apply to both primary and secondary batteries of aqueous, nonaqueous, ionic liquid, and solid state systems. While consumer single use primary alkaline battery cells are the main focus of the accompanying description, the following description may be equally applied to any battery cell, including but not limited to rechargeable alkaline battery cells, such as rechargeable alkaline manganese (RAM) battery cells, as well as any other type of battery cell that includes an electrolyte solution.

The seal assemblies according to the disclosure may be included in any type of electrochemical battery cell. For example, the seal assemblies according to the disclosure may be employed in consumer alkaline electrochemical cells of any size and/or shape (including for example, batteries having cylindrical, rectangular, or square shapes or cross-sectional shapes) including, but not limited to, AAAA cells, AAA cells, AA cells, B cells, C cells, D cells, 9V cells, and the like.

Figure 1:
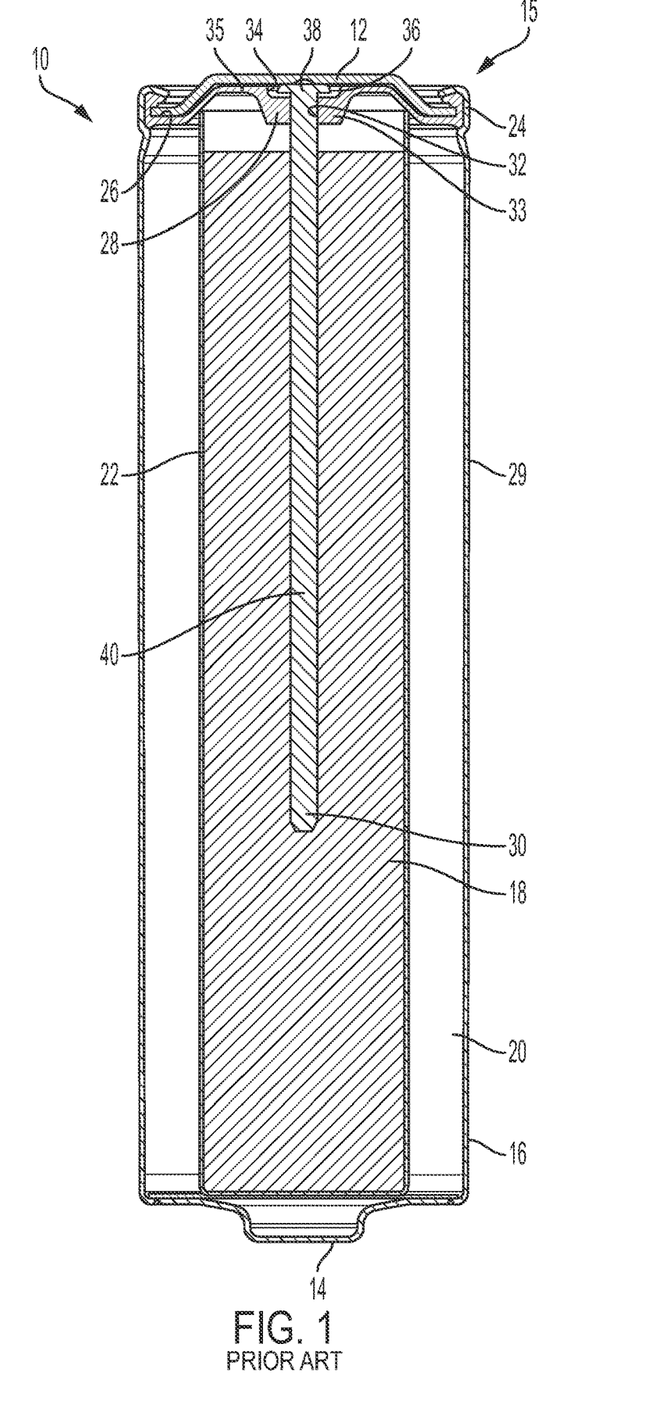
FIG. 1 is a cross-sectional view of a prior art battery cell.

Turning now to FIG. 1, one example of a traditional alkaline battery cell 10 is illustrated. The battery cell 10 includes first and second covers 12, 14, which correspond to the negative and positive battery terminals, respectively, with a housing 16 generally being disposed therebetween. To separate an anode 18 from a cathode 20, the battery cell 10 includes a separator 22. To close an end 24 after the components of the battery cell 10 are disposed within the housing 16, the first cover 12 is received within a groove 26 of a grommet or seal 28 disposed proximate to a distal end 15 of the housing 16, and a sidewall 29 of the housing 16 is crimped over a peripheral edge of the seal 28. In some examples, the seal 28 is spaced from the cathode 20 to enable the cathode 20 to expand. In some examples, the seal 28 is similarly spaced from the anode 18 to enable the anode 18 to expand.

To couple an anode current collector 30 and the first cover 12, which provides a negative terminal in the assembled battery cell 10, in this example, the seal 28 includes a first opening 32 having a wider portion 34 defining a head clearance or space 36, where an end or head 38 of the anode current collector 30 (sometimes referred to as a "nail") is positioned and electrically coupled to the first cover 12. This space 36 may have a chamfered or angled configuration to accommodate the head 38. In this example, a body 40 of the anode current collector 30 extends through the first opening 32 and into the anode 18. An electrolyte solution is contained within the housing 16.

The seal 28 of FIG. 1 includes a cylindrical portion or boss 33 that surrounds the first opening 32. The boss 33 extends downward from a planar seal portion or shelf 35 that extends laterally outward from the boss 33. The boss 33 of FIG. 1 is referred to herein as a short boss. Short bosses extend either below the shelf 35 or above the shelf 35, but not both.

As discussed above, battery cells are susceptible to electrolyte leakage, for example, due to electrolyte creepage, along the body of the anode current collector 30, such that electrolyte can escape from the first opening 32 in the seal 28. Prior attempts to prevent leakage have been made by providing a sealant around the nail in the opening 32, with the result that the sealant is "squeegeed" or wiped up during assembly (by the interference fit with the seal 28) and thus ultimately disposed in the space 36 around the head 38. However, the sealant may not be uniformly provided around the head and thus may not provide a uniform seal and/or may be displaced from the space 36 by electrolyte creepage. Moreover, this existing arrangement is more susceptible to developing leaks due to imperfections that may be introduced during manufacturing.

For example, the distal end of the anode current collector 30 (e.g., the bottom end in FIG. 1) may have burrs or flashes, which, because of the interference fit provided between these components, can scratch the inside surface of the first opening 32 during assembly. More specifically, when the anode current collector 30 is pushed downward, through the first opening 32 during assembly, any protruding surfaces from the anode current collector 30 may scrape against the side of the first opening 32 of the seal 28. As a result, imperfections may form in the interior surface of the first opening 32. These imperfections can facilitate migration and thus creepage of electrolyte upwards, through the first opening 32, as described above.

The disclosed seal 28 may be formed by a variety of manufacturing techniques, molding processes. In particular, injection molding and blow molding, which use pins to create voids, are particularly advantageous. Imperfections can be formed during injection or blow molding of the seal 28 that are similar to those described above with respect to the anode current collector because the pins used in injection and blow molding may also have imperfections such as burrs and flashes. Typically, the seal 28 is formed by injection molding and a pin is used during the molding process to create a void forming the first opening 32 of the seal 28. The distal end of such injection molding pins are ground and thus frequently have burrs or flashes as a result, which can also cause the formation of scratches during manufacture. For example, as the pin is withdrawn from the first opening 32 after the molding process is complete, any imperfections in the pin may scratch internal surfaces of the seal 28 as the pin is withdrawn, similar to the anode current collector 32 scratching the internal surfaces as described above with respect to nail insertion into the seal assembly.

When sealant is applied to the anode current collector 30 of FIG. 1, during assembly the sealant is wiped up along the axis of the anode current collector 30 as it is inserted into the first opening 32 by the interference fit between the anode current collector 30 and the first opening 32, thereby causing the sealant to collect at a top of the anode current collector 30 near the head 38. Electrolyte from inside the housing 16 can migrate up towards the head 38 along the body 40 of the current collector 30, especially along the path of any imperfections introduced into the seal 28 during the manufacturing process as described above. Any sealant deposited at the top of the anode current collector 30 near the head 38 may be overcome by electrolyte creepage along the anode current collector. As a result, electrolyte leaks may form.

Figure 2:
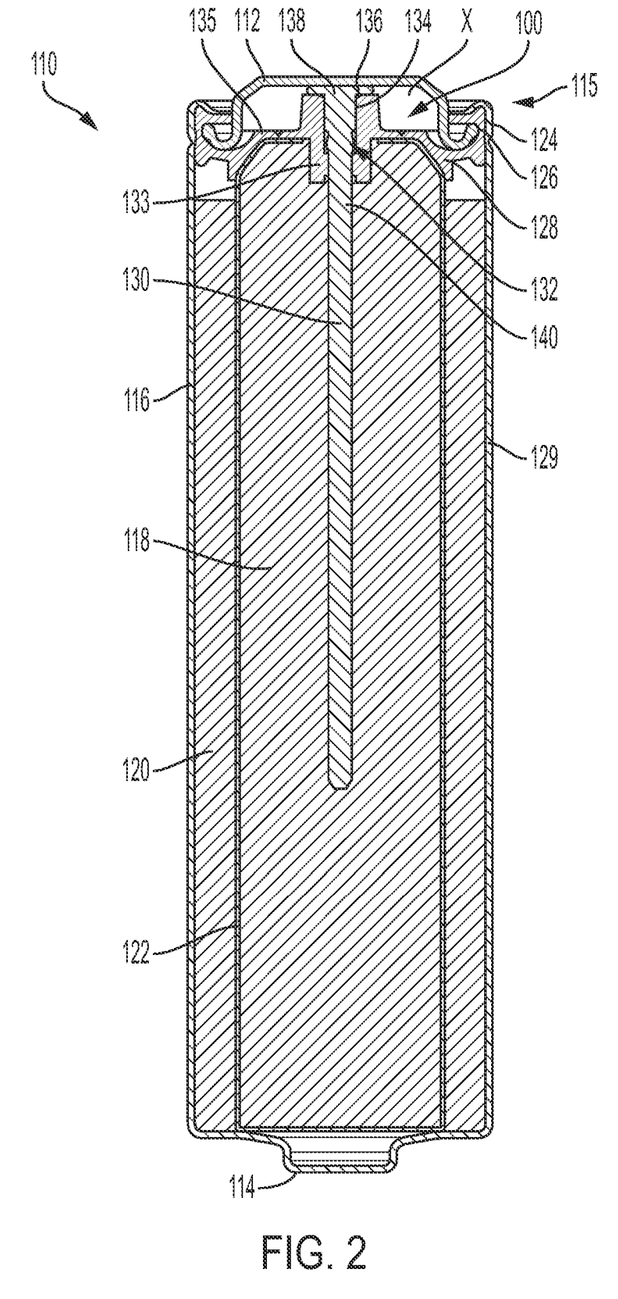
FIG. 2 is a cross-sectional view of a battery cell comprising a trapped sealant seal assembly according to the disclosure.

Turning now to FIG. 2, one example of a battery cell 110 having a trapped sealant seal assembly is illustrated. Similar to the example in FIG. 1, the battery cell 110 includes first and second covers 112, 114, which correspond to the negative and positive battery terminals, respectively, with a housing 116 generally being disposed therebetween. To separate an anode 118 from a cathode 120, the battery cell 110 includes a separator 122.

The cathode 120 may comprise any known electrochemically active cathode material including but not limited to manganese oxide, manganese dioxide, electrolytic manganese dioxide (EMD), chemical manganese dioxide (CMD), high power electrolytic manganese dioxide (HP EMD), lambda manganese dioxide, gamma manganese dioxide, beta manganese dioxide, and mixtures thereof. Other electrochemically active cathode materials include, but are not limited to, silver oxide; nickel oxide; nickel oxyhydroxide; copper oxide; copper salts, such as copper iodate; bismuth oxide; high-valence nickel compound; high-valence iron compound; and mixtures thereof. The nickel oxide can include nickel hydroxide, nickel oxyhydroxide, cobalt oxyhydroxide-coated nickel oxyhydroxide, partially delithiated layered nickel oxide, and mixtures thereof. Partially delithiated layered nickel oxides suitable for use as the electrochemically active cathode material are described in U.S. Pat. No. 10,910,647B2, which is hereby incorporated herein by reference. The nickel hydroxide or oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel oxyhydroxide and gamma-nickel oxyhydroxide. The high-valence nickel compound may, for example, include tetravalent nickel. The high-valence iron compound may, for example, include hexavalent iron. The electrochemically active cathode material may include a combination of one or more of the foregoing exemplary electrochemically active cathode materials.

Cathode 120 may include a conductive additive, such as carbon particles, and a binder. The carbon particles are included in the cathode 120 to facilitate electron flow through the cathode 120. The carbon particles may be graphite, such as expanded graphite and natural graphite; graphene, single-walled nanotubes, multi-walled nanotubes, carbon fibers; carbon nanofibers; and mixtures thereof. It is preferred that the amount of carbon particles in the cathode is relatively low, e.g., less than about 10%, less than about 7.0%, less than about 4.25%, less than about 3.75%, less than about 3.5%, or even less than about 3.25%, for example from about 2.0% to about 3.25%. The lower carbon level enables inclusion of a higher loading of electrochemically active cathode material within the cathode 120 without increasing the volume of the cathode 120 or reducing the void volume of the finished battery 10 (which must be maintained at or above a certain level to prevent internal pressure from rising too high as gas is generated within the cell). Suitable expanded graphite may be, for example, BNB-90 graphite available from TIMCAL Carbon & Graphite (Bodio, Switzerland).

Examples of binders that may be used in the cathode 120 include polyethylene, polyacrylic acid, or a fluorocarbon resin, such as PVDF or PTFE. An example of a polyethylene binder is sold under the trade name COATHYLENE HA-1681 (available from Hoechst or DuPont). Examples of other cathode additives are described in, for example, U.S. Pat. Nos. 5,698,315, 5,919,598, 5,997,775 and 7,351,499.

Anode 118 comprises at least one electrochemically active anode material, and typically further comprises a gelling agent, and minor amounts of additives, such as gassing inhibitor. The electrochemically active anode material may include zinc; cadmium; iron; metal hydrides, including but not limited to $AB_5$, $AB_2$, and $A_2B_7$ metal hydride alloys; and mixtures thereof. Anode 118 typically is provided as a gelled zinc anode.

To close an end 124 after the components of the battery cell 110 are disposed within the housing 116, the first cover 112 is received within a groove 126 of a grommet or seal 128, disposed proximate to a distal end 115 of the housing 116, and a sidewall 129 of the housing 116 is crimped over a peripheral edge of the seal 128. In some examples, the seal 128 is spaced from the cathode 120 to enable the cathode 120 to expand. In some examples, the seal 128 is similarly spaced from the anode 118 to enable the anode 118 to expand. The cover 112 is disposed above the seal 128 to create a space or void X. The void X allows space for gas to vent when pressure builds up inside the housing 116.

To couple an anode current collector 130 and the first cover 112, which provides a negative terminal in the assembled battery cell 110, in this example, the seal 128 includes a first opening 132 having a wider portion 134 defining a head clearance or space 136, where an end or head 138 of the anode current collector 130 (sometimes referred to as a "nail") is positioned and electrically coupled to the first cover 112. This space 136 may have a chamfered or angled configuration to accommodate the head 138. In this example, a body 140 of the anode current collector 130 extends through the first opening 132 and into the anode 118. An electrolyte solution is contained within the housing 116.

The seal 128 includes a cylindrical portion or boss 133 that surrounds the first opening 132. The boss 133 extends both upward and downward from a planar seal portion or shelf 135 that extends laterally outward from the boss 133. The boss 133 is referred to herein as a long boss. As used herein, "long bosses" are bosses that have cylindrical segments that are provided both above and below the shelf 135.

Figure 3:
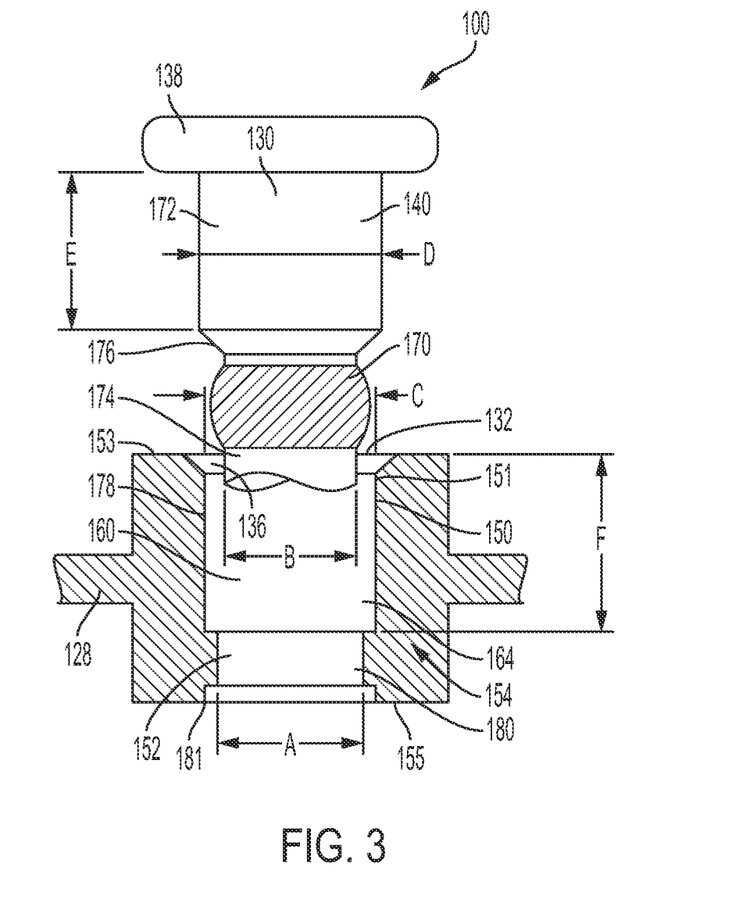
FIG. 3 is an unassembled exploded cross-sectional view of the trapped sealant seal assembly of FIG. 2.
Figure 4:
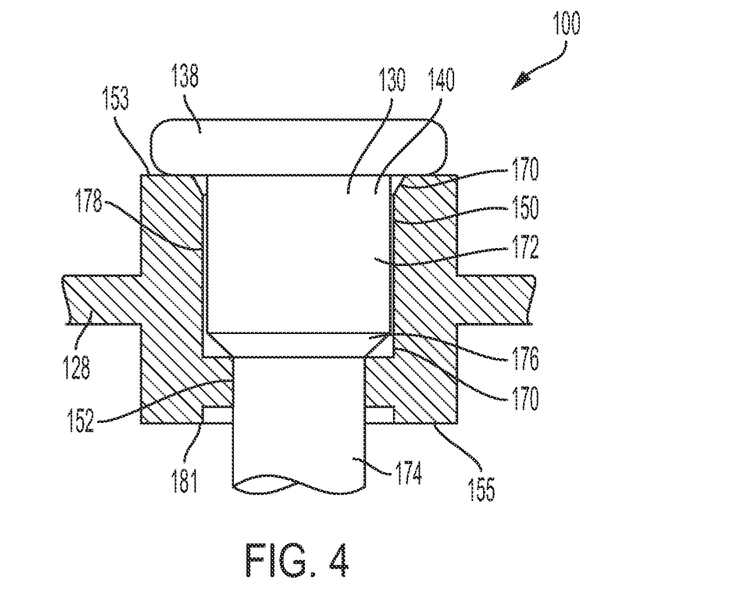
FIG. 4 is a cross-sectional view of the seal assembly of FIG. 3 in an assembled condition.

Turning now to FIGS. 3 and 4, a seal assembly 100 of the battery cell 110 is illustrated in more detail. The seal assembly illustrated in FIGS. 3 and 4 may be implemented in the battery cell 10 shown in FIG. 1, by replacing the conventional seal 28 and anode current collector 30 of FIG. 1 with the grommet 128 and the nail 130 according to the disclosure illustrated in FIGS. 2 and 3. The seal assembly 100 includes the grommet or seal 128, which comprises the headspace 136, which has a headspace diameter and the opening 132 including an inner surface or bore 150 having a bore diameter. The opening 132 has a proximal end 151 near a top 153 of the seal 128, and a distal end 154 near a bottom 155 of the seal 128. When assembled, the proximal end 151 or top 153 of the seal 128 is adjacent the cover 112 that provides a negative terminal for the battery cell 110 and the bottom 155 of the seal 128 is disposed closer to the anode, cathode, and the electrolyte of the battery cell 110. The nail 130 comprises the nail head 138 and the body or stem 140 extending from the nail head 138.

When assembled, the stem 140 extends through the opening 132 in the seal 128 from the proximal end 151 through the distal end 154 and the nail head 138 seats in the headspace 136 near the proximal end 151. The headspace 136 may be chamfered. As assembled, the stem 140 and the seal 128 form a first interference fit 152 adjacent the distal end 154 of the opening 132 and a second interference fit 157 (FIG. 4) between the stem 140 and the seal 128 adjacent the proximal end 151 of the seal 128. When assembled, a trap clearance 160 is formed radially and longitudinally between the stem 140 and the bore 150 and between the distal end 154 of the opening and the nail head 138, or more particularly, between the first interference fit 152 and the second interference fit 157. The trap clearance 160 defines a trap 164 for a sealant 170. The sealant 170 is disposed on the stem 140 and is located at least partially in the trap 164. Thus, the seal 128 opening 132 includes a first clearance (the trap clearance 160) and a second clearance (the headspace 136).

As best illustrated in FIG. 3, the stem 140 of the nail 130 includes a first portion 172 with a first stem diameter D and a second portion 174 with a second stem diameter B. The second stem diameter B is smaller than the first stem diameter D. The first portion 172 also includes a length E that is shorter than a length F of the opening 132, which is bounded by the wiper 180 at one end and by the top 153 of the seal 128 at the other end. The second portion 174 is distal to the first portion 172 relative to the nail head 138. As illustrated, the first portion 172 and the second portion 174 of the stem 140 are joined by a chamfer 176, but a more "abrupt" stepped transition between the first portion 172 and the second portion 174 may also be used, provided that the second portion 174 has a smaller diameter than the first portion 172 as previously described.

The bore 150 includes the bore diameter C. The bore diameter C is larger than the second stem diameter B and smaller than the first stem diameter D.

The trap 164 is formed between the bore 150 and the second portion 174 of the stem 140. The trap 164 is bounded radially on an inner side by the outer surface of the second portion 174 and is bounded radially on an outer side by the inner surface of the bore 150. The trap 164 in the illustrated example forms an annular-shaped space.

In the illustrated example, the seal opening 132 includes an internal annular ring 180, having a ring diameter A, which protrudes from the inner surface of the bore 150 proximate to the distal end 154 of the seal 128. The ring diameter A is smaller than the bore diameter C. As described above, the stem 140 and the seal 128 form a first interference fit 152 adjacent the distal end 154 of the opening 132 between the second stem diameter B and the ring diameter A. In other words, the internal annular ring 180 forms the first interference fit 152 with the second portion 174 of the stem 140 when the stem 140 is fully inserted into the seal 128, as illustrated in FIG. 3, because the second stem diameter B is greater than the ring diameter A. Optionally, a lower bore 181 having a wider diameter than the internal annular ring 180 may be included that opens into the internal components of the battery cell.

The trap 164 is located longitudinally along the stem 140 above the internal annular ring 180. In the example illustrated in FIG. 3, the trap 164 is bounded longitudinally by the internal annular ring 180 and the chamfer 176 in the illustrated embodiment when the stem 140 is fully inserted into the seal 128. This is due to the length E of the first portion 172 being shorter than the length F of the bore 150, with the length E being measured from the bottom of the nail head 138 to a transition or change in internal diameter of the stem 140 (illustrated as a chamfer) and the length F being measured from the proximal end of the opening 132 to the internal annular ring 180. The structural arrangement of the stem 140 in the bore 150 is purposefully arranged to provide a void—which is the trap 164.

In the illustrated example, the bore diameter C is between 0.03 mm and 0.05 mm larger than the second stem diameter B. In other examples, the following dimension ratios advantageously can produce an efficient sealant trap clearance as described herein:

Length E of the first portion of the stem 172: diameter D of the first portion 172 of the stem 140 being between about 1.1 and about 3.0, for example between about 1.1 and about 1.2;

Diameter D of the first portion 172 of the stem 140: diameter B of the second portion 174 of the stem 140 being between about 1.1 and about 3.0, for example between about 1.1 and about 2.0;

Internal ring diameter A of the Internal annular ring 180: diameter B of the second portion 174 of the stem 140 being less than 1.0; and Length F of the bore 150: length E of the first portion 172 of the stem 140 being between about 1.1 and about 2.0, for example between about 1.1 and about 1.5.

In the illustrated example, the trap 164 has a volume of between about 0.35 mm$^3$ and about 1.5 mm$^3$. In other examples, the trap 164 may be configured to have other volumes, for example, depending upon the viscosity of the sealant 170 and/or the size of the battery cell.

The seal 128 according to the disclosure advantageously reduces or eliminates leakage of electrolyte from inside the battery cell by trapping and locating sealant in a clearance between two interferences, thereby positioning the sealant in a location where it can more effectively provide a barrier to electrolyte creepage because the sealing effect of the sealant is further reinforced by an interference fit between the nail 130 and the seal 128 further along the nail 130 axis towards the proximal end 151 of the seal 128. Moreover, the seal 128 according to the disclosure further reduces electrolyte leakage by reducing or compensating for manufacturing defects. More specifically, as described above, the nail 130 may have imperfections, for example, at a distal end (which is located in the second portion 174 of the stem 140 having the second stem diameter B). During assembly, these imperfections are separated from the first inner surface portion 178 of the opening 132 because the second stem diameter B is smaller than the bore diameter C. As a result, no damage is caused to the first inner surface portion 178 of the opening 132 from the nail 130 during assembly. Any damage that could be caused to the seal 128 by the nail 130 during assembly would be confined to the annular ring 180, where an interference fit exists. However, sealant is purposefully and advantageously positioned above the annular ring 180 in the trap 164, as a result of the sealant being disposed on the second portion 174 of the stem 140 and by being wiped by the annular ring 180 during assembly, and thereby can prevent or reduce any electrolyte creepage (including along any damaged areas of the annular ring 180 as a result of nail 130 insertion), particularly because of the reinforcement of the seal provided by the purposefully positioned sealant 170 by the interference fit between the first portion 172 of the stem 140 and the bore 150.

Furthermore, as best illustrated in FIG. 4, the illustrated embodiment advantageously pushes sealant 170 that extends beyond the lateral edges of the seal opening 132 upward, along the first portion 172 of the nail 130 during manufacturing and assembly, thereby depositing a thin layer of sealant 170 between the first portion 172 of the nail 130 and the inner surface 150 of the opening 132. Because, prior to assembly, the bead of sealant is applied below the first portion 172, some sealant 170 existing on the nail 130 is wiped by the first inner surface portion 178 of the opening 132 and then the remaining sealant 170 is pushed downward, by the first portion 172 of the stem 140, which prevents the sealant 170 from escaping upward due to the interference fit between the first portion 172 of the nail 130 and the first inner surface portion 178 of the opening 132. The force applied from the chamfer 176 of the first portion 172 causes the sealant 170 that is pushed downward into the trap 164 to flow into the trap 164 in a relatively uniform manner, resulting in a homogeneous distribution of sealant in the trap 164. As a result, upon nail 130 insertion, the sealant 170 in the trap 164 is advantageously trapped between two interference fits (a first interference fit between the annular ring 180 and the second portion 174 and a second interference fit between the first portion 172 and the first inner surface portion 178) and forms an additional sealing surface, all of which cooperate to form an enhanced seal that reduces or prevents electrolyte from escaping the battery cell. Moreover, the first portion 172 of the stem compresses the sealant 170 in the trap 164, enhancing the effectiveness of the sealant 170. The chamfer 176 controls the rate and the direction of the compression force. Furthermore, the interference fit between the first portion 172 of the stem and the first inner surface portion 178 of the opening 132, helps to prevent compromise of the seal ultimately formed by the sealant 170 and thereby helps maintain effectiveness of the sealant 170 in the seal assembly. Finally, the sealant 170 that is wiped up the first portion 172 of the nail 130 accumulates at the top of the nail 130, just below the nail head 138 and is trapped in the head clearance 136, thereby forming a second bead of sealant 170 above the second interference fit (between the first portion 172 and the first inner surface portion 178), which functions as yet an additional barrier to electrolyte creepage.

Figure 5:
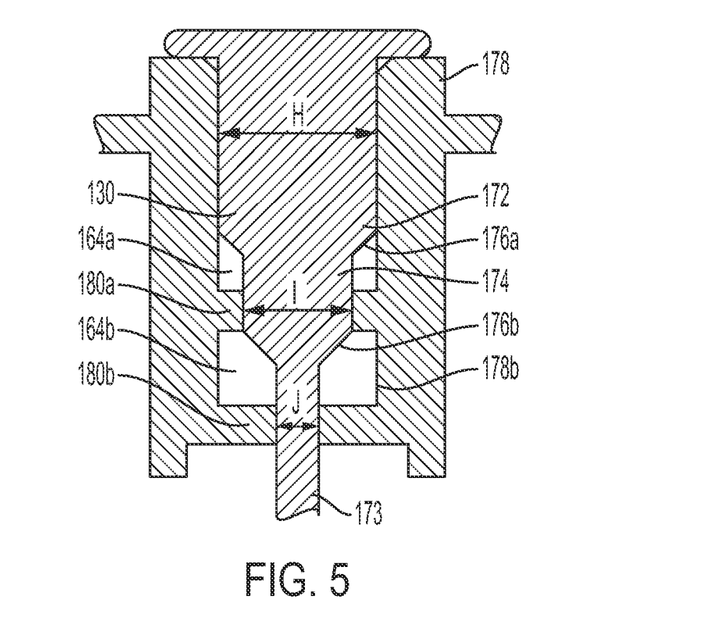
FIG. 5 is a cross-sectional view of an alternate embodiment of a trapped sealant seal assembly.

In alternate embodiments, a plurality of sealant traps 164*a*, 164*b* may be formed, for example as illustrated in FIG. 5. Unnumbered structural elements of the embodiment of FIG. 5 correlate to the same structural elements of the embodiment of FIGS. 2-4 and function accordingly. For example, the nail head (138 in FIGS. 2-4) is not numbered or called out in FIG. 5, but the nail head of the embodiment of FIG. 5 functions the same as the nail head 138 of FIGS. 2-4. The sealant (170 in FIGS. 2-4) is omitted from FIG. 5 for clarity, but the sealant in this embodiment is disposed in the same locations (e.g., within the sealant traps 164*a*, 164*b* and within the head clearance 136) as the sealant in the embodiment of FIGS. 2-4.

The plurality of sealant traps 164*a*, 164*b* form a staged seal that provides enhanced sealing and increased prevention of electrolyte creepage. The nail 130 includes a first portion 172 with a first diameter H, a second portion 174 with a second diameter I, and a third portion 173 with a third diameter J. The first diameter H is larger than both the second diameter I and the third diameter J, and the second diameter I is larger than the third diameter J.

As illustrated, the first sealant trap 164*a* is formed longitudinally between a first chamfer 176*a* and the first annular ring 180*a*, and laterally between the second portion 174 of the nail 130 and a first inner surface portion 178*a*. The second sealant trap 164*b* is formed longitudinally between the second chamfer 176*b* and the second annular ring 180*b*, and laterally between the third portion 173 of the nail 130 and a second inner surface portion 178*b*.

In other embodiments, more than two sealant traps may be formed by adding additional annular rings 180 and staging portions of the nail 130 having different diameters.

Figure 6:
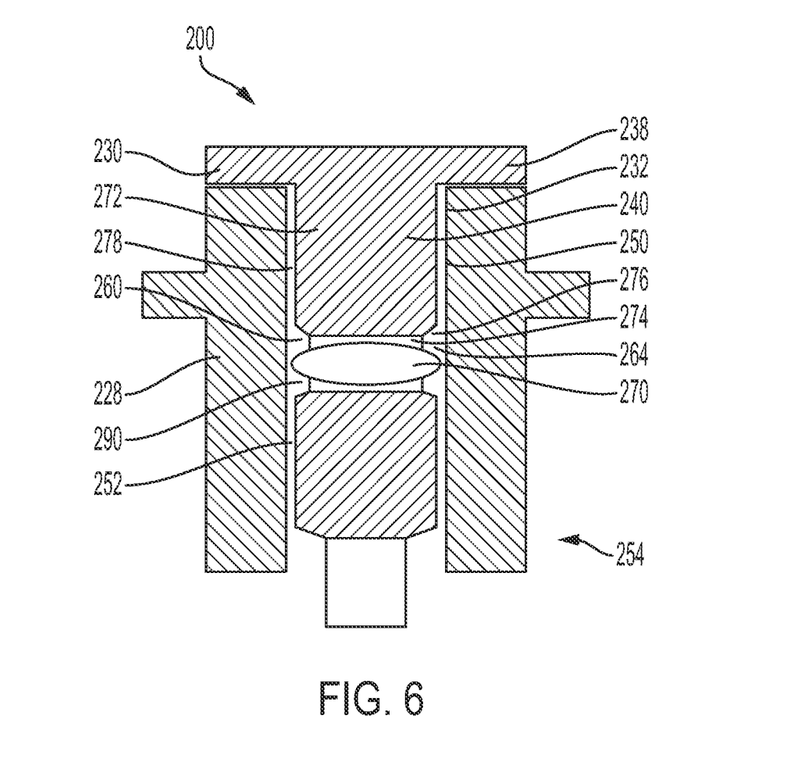
FIG. 6 is a cross-sectional view of another alternate embodiment of a trapped sealant seal assembly.

Turning now to FIG. 6, a cross-sectional view of an alternate embodiment of a seal assembly 200 according to the disclosure is illustrated. The seal assembly 200 illustrated in FIG. 6 may be implemented in the battery cell 110 described in FIG. 2, by replacing the seal 28 and anode current collector 30 of FIG. 1 with the seal 228 and the nail 230 according to the disclosure illustrated in FIG. 5. The seal assembly 200 includes the seal 228, which comprises an opening 232 including a bore 250 having a bore diameter. The nail 230 has a nail head 238 and a body or stem 240 extending from the nail head 238. The stem 240 extends through the opening 232 in the seal 228. The stem 240 and the seal 228 form a first interference fit 252 at a distal end 254 of the opening 232. A trap clearance 260 is formed between the distal end 254 of the opening and the nail head 238. The trap clearance 260 defines a trap 264 for a sealant 270. The sealant 270 is disposed on the stem 240 and is located at least partially in the trap 264.

The stem 240 includes a first portion 272 with a first stem diameter and a second portion 274 with a second stem diameter. The second stem diameter is smaller than the first stem diameter. The second portion 274 is distal to the first portion 272 relative to the nail head 238. The first portion 272 and the second portion 274 are joined by a chamfer 276, but a more "abrupt" stepped transition between the first portion 272 and the second portion 274 may also be used, provided that the second portion 274 has a smaller diameter than the first portion 272 as previously described.

The bore 250 diameter is larger than the second stem diameter and smaller than the first stem diameter.

The trap 264 is formed between the bore 250 and the second portion 274 of the stem 240. The trap 264 is bounded radially on an inner side by the outer surface of the second portion 274 of the stem 240 and is bounded radially on an outer side by an inner surface 278 of the bore 250. The trap 264 in the illustrated example is provided in part by an annular-shaped recess 290 formed in the nail 230. In the illustrated example, the bore diameter is between 0.03 mm and 0.05 mm larger than the second stem diameter.

The embodiment illustrated in FIG. 6 differs from that illustrated in FIGS. 3-5, in that the embodiment of FIG. 6 does not include the annular ring 180 at the distal end 254 of the opening 232. Rather, the embodiment of FIG. 6 includes an annular recess 290 formed between the second portion 274 of the stem 240 and the bore 250. The sealant trap 264 is provided by the annular recess 290.

In alternate embodiments, the stem 240 may include a plurality of annular recesses 290.

Test Data

Battery cells having the trapped sealant seal assemblies described above, with respect to FIGS. 2-4, were subject to leakage testing and compared to control cells tested under the same conditions. One set of control cells that were tested included the same components (anode, cathode, separator, seal assembly, current collector) and concentrations found in commercially available AA COPPERTOP® cells and thus these control cells are referred to as AA COPPERTOP® cells herein. Also included in the data is another set of control cells labeled "Control Wiped Polyamide Long Boss" and "Control Wiped Asphalt Long Boss," which are not commercially available cells Both of the "Control Wiped Long Boss" control cells include a long boss and a wiped sealant. The "Control Wiped Long Boss" control cells do not include staged outer diameters of the nail, or the staged inner diameters of the boss opening that are described with respect to the trapped sealant configuration according to the invention. The "Control Wiped Long Boss" control cells provide a comparative example that specifically isolates the effect of the trapped sealant design according to the invention. More specifically, the improvement between the "Trapped Long Boss" and the "Control Wiped Long Boss" is attributable solely to the trapped sealant configuration according to the invention.

The leakage test conducted on the battery cells included flushing the space between the seal or grommet and the top cover (labeled as void X in FIG. 2), with deionized water, placing the cell in an environmental chamber at 50° C. and greater than 60% relative humidity to facilitate accelerated aging for 3, 6, or 9 weeks, removing the cell from the chamber and extracting any chemicals in void X by flushing again with deionized water, capturing the deionized water and analyzing the deionized water for the presence of potassium. Any potassium found in the deionized water is presumed to have been created by electrolyte creep between the nail and the seal or grommet because the seal or grommet comprises a polymer material that does not allow quantifiable amounts of potassium to pass directly through the polymer material.

Two different boss lengths and two different sealants were included in the test cells. The two boss lengths were long and short bosses and the two different sealants were polyamide and asphalt. The AA COPPERTOP® control cells comprised short bosses with the selected sealant in a wiped configuration as described above where the sealant is placed on the nail and it is "wiped" up the nail as the nail is inserted into the seal such that the sealant is placed proximate to the nail head after nail insertion. The second control cell group included a long boss with the selected sealant in a wiped configuration, again with the sealant being placed proximate to the nail head after nail insertion. The trapped sealant cells according to the invention included a seal assembly having the sealant trap discussed above, with respect to FIGS. 2-4, in a long boss. The trapped sealant cells exhibited surprisingly and significantly less leakage than both the COPPERTOP® control cells and the wiped long boss control cells.

The results of the testing are summarized in Tables 1 and 2 below.

TABLE 1

| Design | Average | Standard Error | Lower Limit | Upper Limit |
| --- | --- | --- | --- | --- |
| Example 1 - Trapped Polyamide Long Boss | 0.78475 | 0.037287 | 0.710954 | 0.858546 |
| Control Wiped Polyamide Long Boss | 1.2315 | 0.0320915 | 1.16799 | 1.464252 |
| COPPERTOP ® AA | 2.31 | 0.0453842 | 2.22018 | 2.39982 |

TABLE 2

| Design | Average | Standard Error | Lower Limit | Upper Limit |
| --- | --- | --- | --- | --- |
| Example 2 - Trapped Asphalt Long Boss | 1.41267 | 0.0262026 | 1.36081 | 1.46452 |
| Control Wiped Asphalt Long Boss | 1.5455 | 0.320915 | 1.48199 | 1.60901 |
| COPPERTOP ® AA | 2.31 | 0.0453842 | 2.22018 | 2.39982 |

Figure 7:
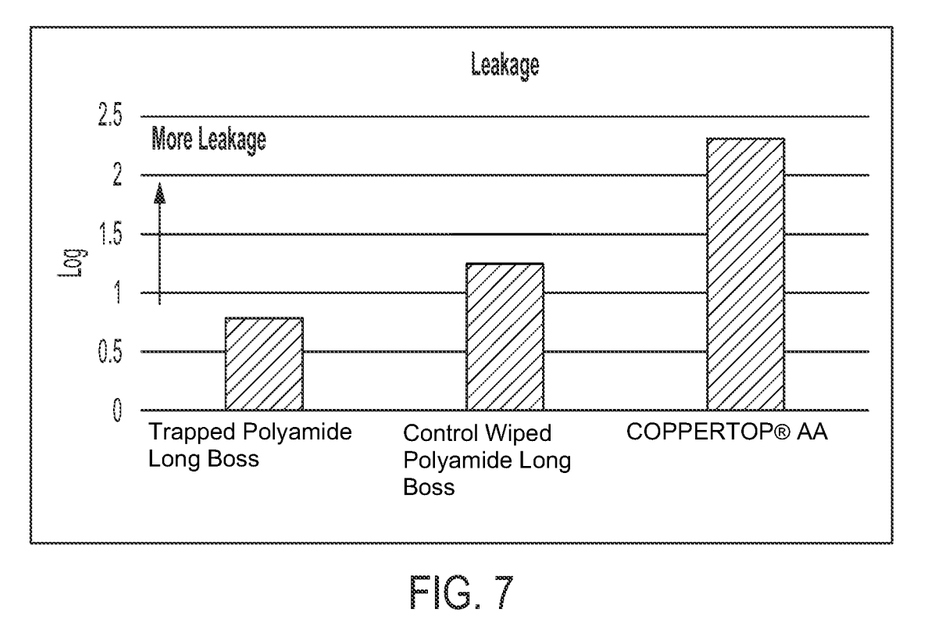
FIG. 7 is a graphical representation of leakage test data for a seal assembly according to the disclosure including a first sealant.
Figure 8:
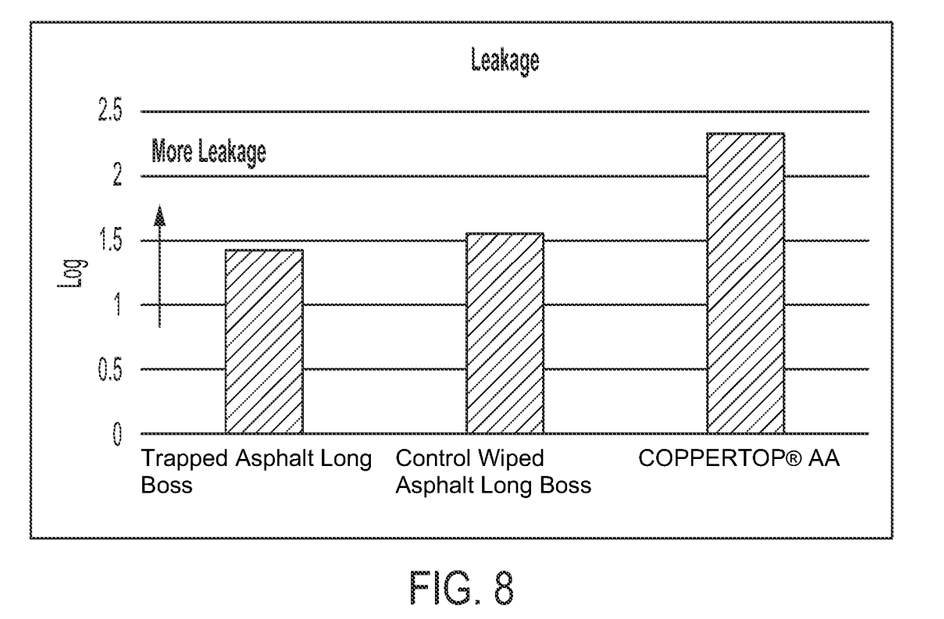
FIG. 8 is a graphical representation of leakage data for a seal assembly according to the disclosure including a second sealant.

The tabular results above are illustrated in graphical form in FIGS. 7 and 8. Two general conclusions were drawn from the test data. First, polyamide appeared to generally perform better than asphalt, which suggests that other relatively non-polar sealants such as silicone sealants, epoxy sealants, and the like may also perform similarly in this assembly. However, the second, and most significant conclusion is that the trapped sealant seal assembly (as described herein) performed surprisingly and significantly better than both the commercially available COPPERTOP® and the control wiped long boss configuration. To summarize, the trapped sealant polyamide configuration showed 66% less leakage than the COPPERTOP® cells and the trapped sealant asphalt configuration showed 38% less leakage than the COPPERTOP® cells. The trapped sealant polyamide configuration also showed 49% less leakage than the control wiped long boss polyamide configuration and the trapped sealant asphalt configuration showed 8.5% less leakage than the control wiped long boss asphalt configuration.

While some improvement over the control cells was expected with the trapped sealant configuration, the magnitude of improvement that was achieved was unexpected and surprising, particularly for the trapped polyamide long boss design.

A trapped short boss configuration was not tested because the short boss configuration does not provide adequate space to practically implement the trapped sealant. In other words, a short boss seal does not have enough space within the inner bore to incorporate a seal trap with enough volume to make the trapped sealant effective.

In any of the foregoing embodiments, the seal or grommet may comprise a polymer, particularly one or more thermoplastic polymers such as polypropylene or nylon. Nylon 66 and nylon 612 are two specific representative materials that may be used alone or in combination.

In any embodiment, the nail may comprise a conductive metal, for example, brass or bronze (including silicon bronze). Brass alloys having a copper content greater than about 50% by weight, for example, 60 wt. % or 70 wt. % and a zinc content greater than 20 wt. %, for example, 30 wt. % or 40 wt. % may be used.

The sealant may be any known sealant capable of adhering the grommet to the nail. Thus, in the illustrated embodiments, the sealant may comprise a polyamide sealant, a resin, a polyvinyl acetate sealant, a petroleum-based material such as an asphalt sealant, a polybutene sealant, a polyisobutylene sealant, a polyethylene wax sealant, an epoxy sealant, a silicone sealant, an acrylic sealant, a polysulfide sealant, a polyurethane sealant, and mixtures thereof. In the illustrated embodiments, the grommet comprises a polymer and the nail comprises a metal. In one refinement, a relatively hydrophilic sealant comprising a water-swellable polymer may be used to provide the sealant, for example, a water-swellable acrylate polymer including particles of superabsorbents such as SikaSwell® sealants (Sika AG, Switzerland). Solvents that may be advantageously employed to formulate the sealant for application to the nails include but are not limited to xylene, isopropanol, toluene, and mixtures thereof. In other embodiments, the formulated sealant may comprise a viscosity between about 165 cps and about 1600 cps, with a solids content between about 40% and about 80%. Moreover, in other embodiments, the sealant may advantageously comprise an anaerobic sealant because exposure of the sealant to oxygen is effectively eliminated when the seal assembly is fully assembled such that the sealant trap is formed between the interference fits above and below the trap. Because the sealant can be in the uncured state initially after the nail is inserted into the grommet, the sealant may have sufficient time in the liquid phase to fully fill the trap and to fill any defects, including the manufacturing defects mentioned above, present in the seal and even in the nail, before curing.

The disclosed seal assemblies advantageously trap sealant in the sealant trap, thereby minimizing exposure of the assembled battery cell to oxygen and preventing the electrolyte from migrating to the top of the nail and escaping from the seal assembly. Furthermore, the sealant is effectively disposed in the sealant trap, because of the interference fit between the nail stem and the seal at a distal end of the seal opening, and the relatively larger internal diameter of the first inner portion of the opening relative to the second more narrow inner portion of the opening (e.g., provided by the internal annular ring). The internal annular ring(s) wipes the remaining sealant from the stem as the stem is inserted into the seal and precisely positions the sealant in the sealant trap. Because the sealant is deposited on the nail stem in liquid form prior to seal assembly, the sealant flows uniformly into the sealant trap, due to the wiping of the internal annular ring, to provide a substantially uniform 360-degree seal between the nail and the grommet in a consistent, and controlled reproducible fashion. The sealant in the sealant trap combines with the interference fits above and below the sealant trap to effectively form a seal assembly having three distinct sealing surfaces that prevents or greatly reduces the amount of electrolyte leakage. When sealant is also disposed in the head clearance, four distinct sealing surfaces are formed (the fourth sealing surface being formed by the sealant in the head clearance). In embodiments having more than one sealant trap (e.g., the embodiment illustrated in FIG. 5) five or more distinct sealing surfaces may be formed. Furthermore, the location of the sealant in the sealant trap (i.e., between the two interference fits) creates an additional barrier to any electrolyte that successfully migrates through the lower interference fit (which in the first embodiment is produced by the annular ring and the second portion of the nail stem). The disclosed seal assemblies also advantageously mitigate manufacturing flaws in the seal, such as flashes or burrs caused by inserting the nail into the seal and withdrawing a pin during molding of the seal as described above.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm." Moreover, any dimension disclosed in one embodiment is equally applicable in other embodiments. Where an "interference" fit is described above, alternative embodiments could have a very small clearance if a more viscous sealant is used. For example, as viscosity of the sealant increases, the ratio of the diameter A of the annular ring 180 to the diameter B of the second portion 174 of the nail 130 may exceed values greater than 1.0. In such examples, the diameter A being larger than diameter B may facilitate exhausting of gas in the opening 132 during assembly by allowing gas to escape through the very small gap between diameter A and diameter B as the nail 130 is inserted into the seal 128, while the viscous sealant then seals that gap when the sealant contacts the annular ring 180.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A seal assembly for a battery cell, the seal assembly comprising:
   a grommet having an opening including an inner surface;
   a nail, the nail having a nail head and a stem extending from the nail head, the stem including a first portion with a first stem diameter and a second portion with a second stem diameter, the first stem diameter being larger than the second stem diameter, the stem extending through the opening in the grommet, the stem and the grommet forming a first interference fit at a distal end of the opening and a trap clearance between the distal end of the opening and the nail head, the trap clearance being located between the second portion of the nail and the inner surface, and the trap clearance defining a trap for a sealant; and
   a sealant disposed on the stem, the sealant being located at least partially in the trap.

2. The assembly of claim 1, wherein the first portion and the second portion are joined by a chamfer.

3. The assembly of claim 1, wherein the inner surface of the opening includes a bore diameter, the bore diameter being larger than the second stem diameter and smaller than the first stem diameter.

4. The assembly of claim 1, wherein the grommet opening includes an internal annular ring.

5. The assembly of claim 4, wherein the internal annular ring has a ring diameter that is smaller than the bore diameter, and the internal annular ring forms the first interference fit with the second portion of the stem.

6. The assembly of claim 4, wherein the trap is located above the internal annular ring, along a length of the stem.

7. The assembly of claim 1, wherein the stem includes an annular recess.

8. The assembly of claim 7, wherein the trap clearance is formed by the annular recess.

9. The assembly of claim 1, wherein the sealant comprises a polyamide or asphalt based material.

10. The assembly of claim 1, wherein a head clearance is formed between the nail head and the grommet and sealant is also disposed in the head clearance.

11. A battery cell comprising:
   a housing, including:
      a first cover at a first housing end and a second cover at a second housing end, and an anode and a cathode disposed within the housing; and
   a seal assembly proximate the first cover, the seal assembly including:
      a grommet having an opening including an inner surface;
      a nail, the nail having a nail head and a stem extending from the nail head, the stem including a first portion with a first stem diameter and a second portion with a second stem diameter, the first stem diameter being larger than the second stem diameter, the stem extending through the opening in the grommet, the stem and the grommet forming a first interference fit at a distal end of the opening and a trap clearance between the distal end of the opening and the nail head, the trap clearance being located between the second portion of the nail and the inner surface, and the trap clearance defining a trap for a sealant; and
      a sealant disposed on the stem, the sealant being located at least partially in the trap.

12. The battery cell of claim 11, wherein the inner surface of the opening includes a bore diameter, the bore diameter being larger than the second stem diameter and smaller than the first stem diameter.

13. The battery cell of claim 11, wherein the grommet opening includes an internal annular ring.

14. The battery cell of claim 13, wherein the trap is located above the internal annular ring, along a length of the stem.

15. The battery cell of claim 11, wherein the stem includes an annular recess.

16. A seal assembly for a battery cell, the seal assembly comprising:
   a grommet having an opening including a distal end, a proximal end, and a bore having an inner surface between the distal end and the proximal end, an internal annular ring positioned proximate the distal end, the internal annular ring having a ring diameter, the bore having a bore diameter, and a headspace located at the proximal end, the headspace having a headspace diameter, the ring diameter being smaller than the bore diameter and the headspace diameter, and the bore diameter being smaller than the headspace diameter;
   a nail, the nail having a nail head and a stem extending from the nail head, the stem including a first portion with a first stem diameter and a second portion with a second stem diameter, the first stem diameter being larger than the second stem diameter, the stem extending through the opening in the grommet, the stem and the grommet forming a first interference fit at between the second portion of the stem and the ring diameter, and the stem and the grommet forming a trap clearance between the second portion of the stem and the bore diameter, the trap clearance defining a trap for a sealant; and
   a sealant disposed on the stem, the sealant being located at least partially in the trap.

17. The assembly or battery cell of claim 16, wherein the inner surface of the opening includes a bore diameter, the bore diameter being larger than the second stem diameter and smaller than the first stem diameter.

18. The assembly or battery cell of claim 16, wherein the grommet opening includes an internal annular ring.

19. The assembly or battery cell of claim 18, wherein the trap is located above the internal annular ring, along a length of the stem.

20. The assembly or battery cell of claim 16, wherein the stem includes an annular recess.

* * * * *